(12) United States Patent
Mitchell et al.

(10) Patent No.: US 8,792,624 B2
(45) Date of Patent: Jul. 29, 2014

(54) LOCAL PRESERVATION OF AN AGENT MESSAGE

(75) Inventors: Robert Mitchell, Aberdeen, NJ (US); William Jolicoeur, Cary, NC (US); Joseph M. Wallerius, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 22 days.

(21) Appl. No.: 13/549,935

(22) Filed: Jul. 16, 2012

(65) Prior Publication Data

US 2014/0016762 A1 Jan. 16, 2014

(51) Int. Cl.
*H04M 11/00* (2006.01)
*H04M 1/64* (2006.01)

(52) U.S. Cl.
USPC .......................................... 379/88.14; 379/68

(58) Field of Classification Search
USPC .................... 379/265.01–266.1, 88.14, 88.68
See application file for complete search history.

(56) References Cited

U.S. PATENT DOCUMENTS

| | | | | |
|---|---|---|---|---|
| 6,442,247 | B1* | 8/2002 | Garcia | 379/88.18 |
| 7,006,607 | B2* | 2/2006 | Garcia | 379/88.18 |
| 7,680,263 | B2 | 3/2010 | Nice et al. | |
| 2004/0264655 | A1* | 12/2004 | Levine | 379/88.18 |
| 2005/0169454 | A1* | 8/2005 | Gregerson | 379/265.09 |
| 2007/0263791 | A1 | 11/2007 | Alperin et al. | |
| 2011/0078270 | A1* | 3/2011 | Galli et al. | 709/206 |
| 2012/0196571 | A1* | 8/2012 | Grkov et al. | 455/411 |

* cited by examiner

*Primary Examiner* — Simon Sing
*Assistant Examiner* — Solomon Bezuayehu
(74) *Attorney, Agent, or Firm* — Sheridan Ross P.C.

(57) ABSTRACT

An agent of a contact center records an agent message. The recorded agent message is received at the contact center. The recorded agent message is stored. An agent actively using one of a first communication device or a second communication device is detected. In response to detecting that the agent is actively using the first or the second communication device, the recorded agent message is sent to the one of the first or the second communication devices that the agent is actively using. The system and method also has a peer-to-peer configuration for recording and sending agent messages.

19 Claims, 5 Drawing Sheets

FIG. 5

LOCAL PRESERVATION OF AN AGENT MESSAGE

TECHNICAL FIELD

The system and method relates to contact centers and in particular to recording agent messages.

BACKGROUND

Modern day contact centers allow an agent to record one or more agent messages and then play the agent messages when a customer calls the contact center. For example, if the agent's name were John Doe, the agent may record an agent message that says "Hello, my name is John Doe. How may I assist you?" This allows the agent a moment to prepare to speak with the customer. The agent may record additional agent messages based on specific customers or specific telephone numbers.

Current contact center systems allow the agent to record and store the agent messages locally on a telephone. This works fine in situations where the same agent always uses the same telephone. However, problems arise if the agent uses a different telephone, which is common in many contact centers where agents may sit at any particular desk based on a first-come first-served order. To use a different telephone, the agent has to re-record the agent messages for each telephone that the agent uses. This is exacerbated in call centers where there are a lot of agents. The greater number of agent, the longer the delay. In addition, if a second agent uses the same telephone, the agent message that is played may be the agent message of another agent.

An alternative to this is to store the agent messages on a server in a network. This solution also has problems. For example, if the server goes down or is not accessible, the agent will not have access to the agent messages. In addition, because the agent messages are not stored locally, there may be a delay in receiving the agent messages from the server. This can result in lost customer satisfaction because the delay may cause a dead period where the customer is waiting to hear a response from the agent.

Current systems provide either high fidelity in which the agent must always use the same telephone. Alternatively current systems allow flexible seating, but at the cost of fidelity and the risk of delaying the start of playback. What is needed is a solution that provides high fidelity agent greetings without latency wherever the agent sits down to work.

SUMMARY

The system and method are directed to solving these and other problems and disadvantages of the prior art. An agent of a contact center records an agent message. The recorded agent message is received at the contact center. The recorded agent message is stored. An agent that is actively using one of a first communication device or a second communication device is detected. In response to detecting that the agent is actively using the first or the second communication device, the recorded agent message is sent to the one of the first or the second communication devices that the agent is actively using.

In one alternative, the recorded agent message is received from the first communication device and the recorded agent message is sent to the second communication device. In a second alternative, the recorded agent message is received from the first communication device and the recorded agent message is sent to the first communication device.

In yet another alternative, the agent message is sent to a reviewing entity. In another alternative, detecting that the agent is actively using the one of the first or the second communication devices comprises detecting at least one of: a login, a voice recognition, a facial recognition, an RFID registration, a Bluetooth connection, a WiFi connection, a calendar event, and an email.

In another alternative, the recorded agent message is stored in a memory in the one of the first or the second communication devices that the agent is actively using. The method further comprises the steps of detecting that the agent is no longer actively using the one of the first or second communication devices. In response to detecting that the agent is no longer actively using the one of the first or the second communication devices, the recorded agent message is deleted from the memory of the one of the first or the second communication devices.

In another alternative, detecting that the agent is no longer actively using the one of the first or second communication device is based on one of: a logout, facial recognition, voice recognition, a defined time period of when the agent is working, a button push, an RFID event, a WiFi disconnection, a calendar event, and an email.

In yet another alternative, the recorded agent message is stored in a memory in a contact center. In a different alternative, the agent message is recorded on the first communication device or in a contact center.

In another alternative, the recorded agent message comprises at least one of a voice message, a video message, and a text message. In another embodiment, the recorded agent message is a text message and the recorded agent message is sent based on an initiation of an Instant Message session. In another alternative, the recorded agent message is a text message and the text message is converted to audio.

In another embodiment, the system also has a peer-to-peer configuration comprising a plurality of communication devices. A first communication device is configured to record an agent message. The first communication device sends the recorded agent message to a second communication device in response to detecting that an agent is actively using the second communication device. The second communication device that the agent is actively using is configured receive the recorded agent message and store the recorded agent message. The second communication device also detects that the agent is actively using the second communication device. In another embodiment, the recorded agent message is played to a customer of the contact center.

In yet another embodiment, the second communication device is further configured to detect that the agent is no longer actively using the second communication device. In response to detecting that the agent is no longer actively using the second communication device, the second communication device deletes the recorded agent message from a memory of the second communication device.

DETAILED DESCRIPTION

Figure 1:
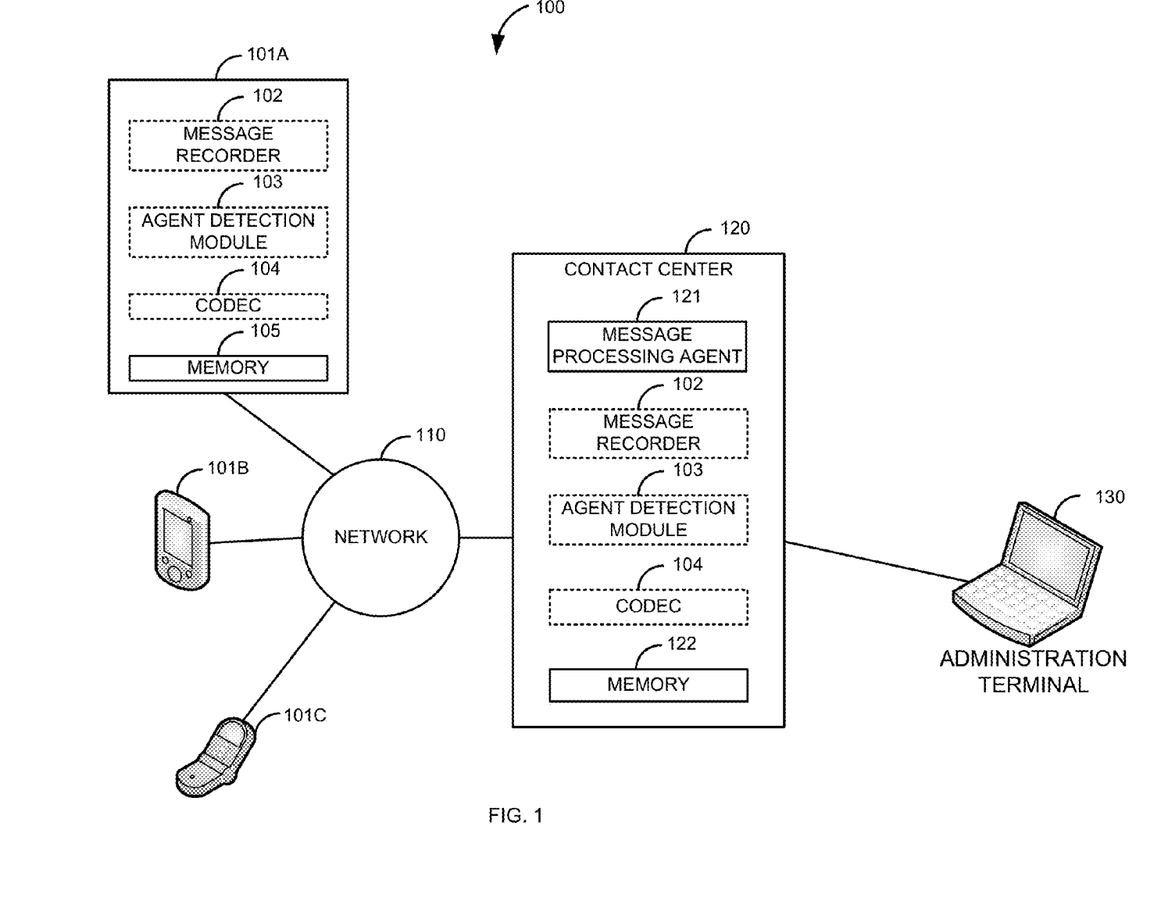
FIG. 1 is a block diagram of a first illustrative system for locally preserving a recorded agent message.

FIG. 1 is a block diagram of a first illustrative system 100 for locally preserving a recorded agent message. The first illustrative system 100 comprises communication devices 101A-101C, network 110, contact center 120, and administration terminal 130.

Communication devices 101A-101C can be any type of communication device, such as a telephone, a cellular telephone, a tablet computer, an agent terminal, a video terminal, a personal computer, a Personal Digital Assistant (PDA), a wired telephone, and/or the like. Communication device 101A may comprise message recorder 102, agent detection module 103, codec 104, and memory 105.

Message recorder 102 can be any hardware/software that can be used to record an agent message. Message recorder 102 can record agent messages in analog or digital format. Message recorder 102 can record an agent message using a tape or disk system. Message recorder 102 can work in conjunction with codec 104 to digitize the agent message. Message recorder 102 is optionally shown (indicated by the dotted box) in communication device 101A and in contact center 120. In one embodiment, message recorder 102 resides only in communication device 101A and not in contact center 120. In another embodiment, both communication device 101A and contact center 120 comprise message recorder 102. In yet another embodiment, message recorder 102 only resides in contact center 120. For example, message recorder 102 can reside within an Interactive Voice Response (IVR) system (not shown) in contact center 120. The message is recorded in contact center 120 by the agent calling contact center 120.

Agent detection module 103 can be any hardware/software that can detect that an agent is actively using communication device 101A. Agent detection module 103 is optionally shown (indicated by the dotted box) in communication device 101A and contact center 120. In one embodiment, Agent detection module 103 resides only in communication device 101A and not in contact center 120. In another embodiment, both communication device 101A and contact center 120 comprise agent detection module 103. In yet another embodiment, agent detection module 103 only resides in contact center 120.

Codec 104 can be any hardware that can encode and decode an audio signal. Codec 104 can also comprise a video codec. Codec 104 may be used to encode and/or decode various audio formats such a MP3, WMA Std 9.2, WMA Pro, AMR-NB, AAC-LC, AAC+, eAAC+, and the like. Codec 104 can reside in either communication device 101A and/or in contact center 120.

Memory 105 can be any type of memory that can store information. For example, memory 105 can comprise a Random Access Memory (RAM), a Flash memory, a disk drive, a RAM drive, a thumb drive, a Read Only Memory (ROM), and the like.

In addition to communication device 101A, the first illustrative system 100 is shown with two additional communication devices 101B-101C for illustrative purposes. However, the first illustrative system 100 can comprise any number of communication devices 101. For example, the first illustrative system 100 may comprise only a single communication device 101A or more communication devices 101 than are shown (101A-101C) in FIG. 1. In addition, communication devices 101B-101C may or may not comprise various elements of message recorder 102, agent detection module 103, and codec 104. Communication devices 101A-101C are shown connecting to network 110. However, in other embodiments, communication devices 101A-101C can be directly connected to contact center 120.

Network 110 can be any network that can send and receive information, such as the Internet, a Wide Area Network (WAN), a Local Area Network (LAN), the Public Switched Communication Network (PSTN), a packet switched network, a circuit switched network, a cellular network, a combination of these, and the like. Network 110 can use a variety of protocols, such as Ethernet, Internet Protocol (IP), Session Initiation Protocol (SIP), Integrated Services Digital Network (ISDN), and the like.

Contact center 120 can be any hardware/software that can handle various contacts. For instance, contact center 120 can handle audio contacts, video contacts, Instant Message (1M) contacts, email contacts, text message contacts, various combinations of these, and the like. Although not shown, contact center 120 can be distributed across different geographic locations. Contact center 120 further comprises message processing agent 121, message recorder 102, agent detection module 103, codec 104, and memory 122. Message processing agent 121 can be any hardware/software that can send and receive packets, agent messages, circuit switched information, and the like.

Memory 122 can be any type of memory that can store information. For example memory 122 can comprise a Random Access Memory (RAM), a Flash memory, a disk drive, a RAM drive, a thumb drive, a Read Only Memory (ROM), and the like.

Administration terminal 130 can be any hardware device that can be used to administer contact center 120. For instance, administration term 130 can be a Personal Computer (PC), a tablet device, a cellular telephone, a communication device 101, a terminal, and the like.

Message processing agent 121 receives a recorded agent message from message recorder 102. An agent message can be any type of greeting that an agent records. The agent message can be based on various factors such as the time of day, a type of service that the agent is performing, ending a call, initiating a call, transferring a call, and/or the like. The agent message is recorded by an agent of contact center 120. The recorded agent message is typically a voice message. However, the recorded agent message may comprise a video message or a text message. For example, the agent can record a video message that is played to a customer when the customer first calls into contact center 120. In an alternative, the agent can record a text message that is used where the agent is supporting an Instant Message (IM) customer. The text message is sent when an IM session is first established with the customer. In still another alternative, the agent can record a text message that is then audibly played to the customer when the customer first calls into contact center 120.

As described previously, message recorder 102 can reside in communication device 101A and/or contact center 120. Message recorder 102 can use codec 104 (either in communication device 101A or in contact center 120) to record the agent message. If the agent message is recorded in communication device 101A (via message recorder 102 in communication device 101A), the recorded agent message is sent via network 110 to message processing agent 121. If the agent message is recorded in contact center 120 (via message recorder 102 in contact center 120), the recorded agent message is sent directly to message processing agent 121. The recorded agent message is stored in memory 122.

In an embodiment, the stored agent message can be sent to a reviewing entity such as a supervisor, a supervisor group, an automated content reviewing application (not shown), and/or the like. The sent agent message can be in audio format or converted to text. The agent message can be reviewed to make sure that the information in the agent message is accurate. The agent message can be reviewed for inaccuracies such as the agent deviating from a required script, grammar, improper language, errors, and the like. If an inaccuracy is found, the agent can be notified in various ways, such as sending an email, an Instant Message, a voice call, and/or the like. Based on the notification, the agent can update the agent message.

Agent detection module 103 detects that the agent is actively using one of communication devices 101A-101C. As described previously, agent detection module 103 can reside in communication device 101 and/or contact center 120. Agent detection module 103 can detect that the agent is actively using communication device 101A in various ways. For example, agent detection module 103 (residing in communication device 101) can detect that the agent is actively using communication device 101 by detecting that the agent has logged into communication device 101. In an alternative embodiment, where agent detection module 103 resides in contact center 120, agent detection module 103 can detect that the agent is actively using communication device 101 based on a call into contact center 120 from communication device 101. Still other alternative ways of detecting that the agent is actively using communication device 101 can include detecting by voice recognition that the agent is actively using communication device 101A, detecting by facial recognition that the agent is actively using communication device 101A, detecting by a button push that the agent is actively using communication device 101A, detecting by a selection that the agent is actively using communication device 101A, and/or the like. In other alternatives, the agent can be detected using RFID, Bluetooth, a WiFi connection, a cellular connection, and/or the like. In response to detecting that the agent is actively using communication device 101, message processing agent 121 sends the recorded agent message to communication device 101.

To further illustrate, consider the following example. The agent records the agent message using message recorder 102 in communication device 101A. The recorded agent message is sent from communication device 101A to contact center 120. Message processing agent 121 receives the recorded agent message. The recorded agent message is stored in memory 122. Agent detection module 103 in communication device 101B detects that the agent is now actively using communication device 101B. Agent detection module 103 in communication device 101B sends a message to message processing agent 121 that indicates that the agent is now actively using communication device 101B. In response, message processing agent 121 sends the recorded agent message to communication device 101B. The recorded agent message is stored in memory 105 in communication device 101B (the communication device 101 that the agent is actively using). The agent at communication device 101B can then play the recorded agent message when supporting a customer.

Agent detection module 103 can also detect that the agent is no longer actively using communication device 101. For example, agent detection module 103 can use a logout, facial recognition, a defined time period of when the agent is working, a button push, an RFID event, a disconnection from Bluetooth, a WiFi disconnection, a call disconnection, a calendar event, an email indicating that the agent is no longer supporting customer contacts, and the like to detect that the agent is no longer actively using communication device 101. In response to detecting that the agent is no longer actively using communication device 101, communication device 101 deletes the recorded agent message from memory 105.

Administration terminal 130 can be used to administer the first illustrative system 100. Administration terminal 130 can also be used to determine that specific recorded agent messages will be sent in response to the agent actively using one of communication devices 101A-101C. For example, the administrator can choose from a list of recorded agent messages which message will be downloaded based on the agent actively using communication device 101. Administration terminal 130 can also be used to define the quality of the recorded agent message. For instance, an administrator can define that the recorded agent message will use standard 8 bit sampling or a higher quality sampling such as 32 bit sampling.

Figure 2:
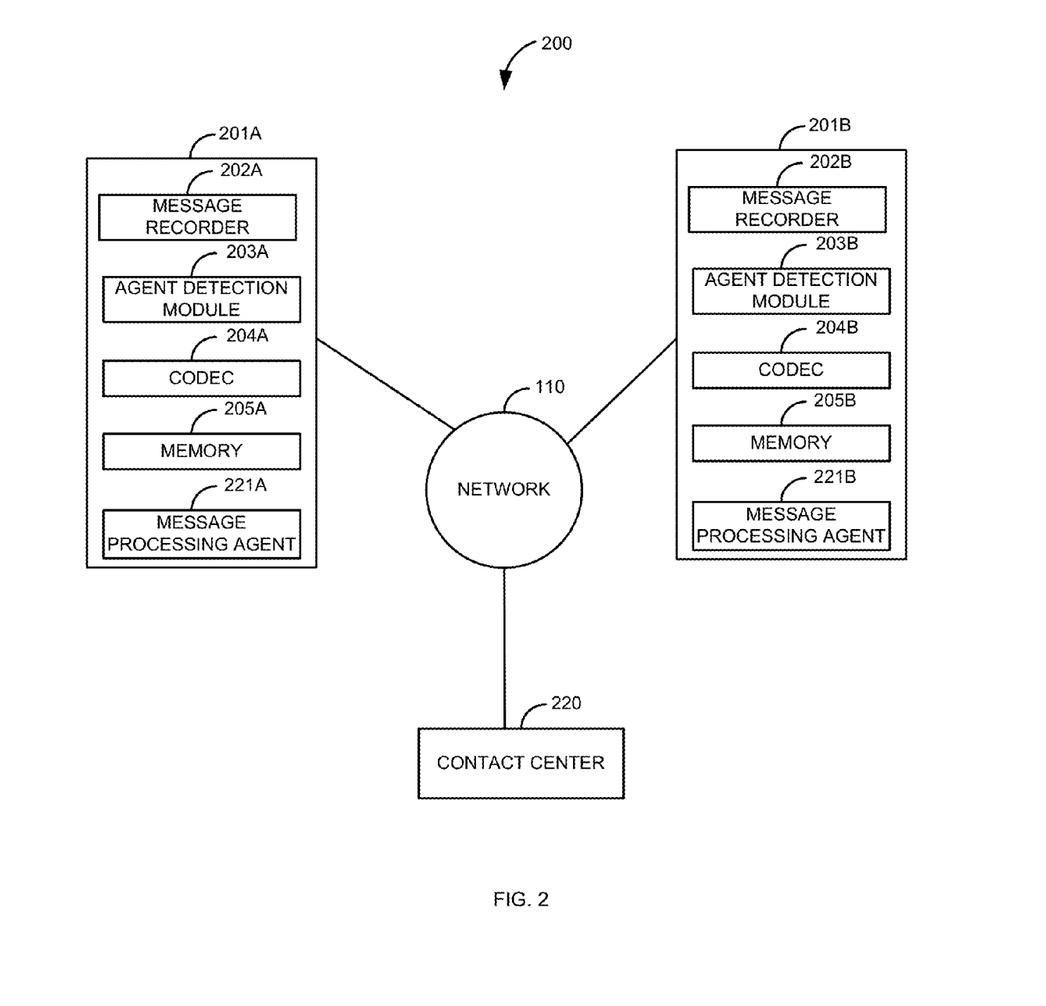
FIG. 2 is a block diagram of an illustrative peer-to-peer system for locally preserving a recorded agent message.

FIG. 2 is a block diagram of an illustrative peer-to-peer system 200 for locally preserving a recorded agent message. System 200 comprises communication devices 201A and 201B, network 110, and contact center 220. Communication device 201A comprises message recorder 202A, agent detection module 203A, codec 204A, memory 205A, and message processing agent 221A. Communication device 201B comprises message recorder 202B, agent detection module 203B, codec 204B, memory 205B, and message processing agent 221B. In addition, system 200 may comprise additional communication devices 201 (not shown).

An agent records an agent message using message recorder 202A. Message recorder 202A can also use codec 204A to record the agent message. The recorded agent message is stored in memory 205A (in the communication device 201 that the agent is actively using). Agent detection module 203B detects that the agent is actively using communication device 201B. Agent detection module 203B sends a message to agent detection module 201A indicating that the agent is actively using communication device 201B. In response to detecting that the agent is actively using communication device 201B, message processing agent 221A sends the recorded agent message to communication device 201B. Message processing agent 221B receives the recorded agent message. Communication device 201B stores the recorded agent message in memory 205A (in the communication device 201 that the agent is actively using). The agent at communication device 201B can now play the recorded agent message when servicing a customer of contact center 120.

In addition, agent detection module 203B can detect that the agent is no longer actively using communication device 201B. For example, agent detection module 203B can use a logout, facial recognition, a defined time period of when the agent is working, a button push, an RFID event, a WiFi disconnection, a calendar event, an email, and the like to detect that the agent is no longer actively using communication device 201B. In response to detecting that the agent is no longer actively using communication device 201B, communication device 201B deletes the recorded agent message from memory 205B.

Detecting that the agent is actively using communication device 201B can be accomplished in various ways such as: detecting a login by the agent at communication device 201B, detecting by voice recognition that the agent is actively using communication device 201B, and detecting by facial recognition that the agent is actively using communication device 201B. The above described processes can also work in a reverse manner where the process of recording starts on communication device 201B and the recorded agent message is sent to communication device 201A.

Figure 3:
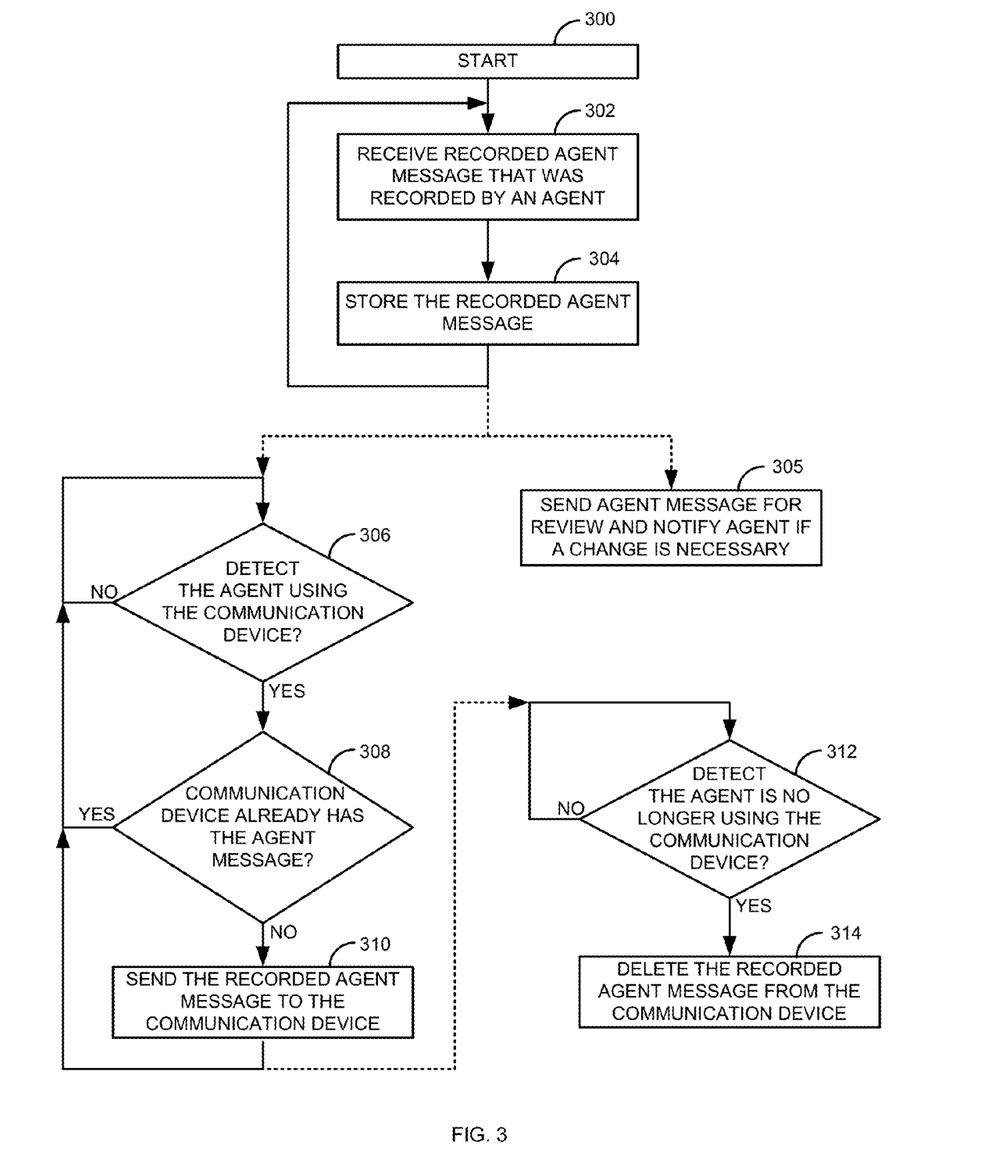
FIG. 3 is a flow diagram of a method for locally preserving a recorded agent message.

FIG. 3 is a flow diagram of a method for locally preserving a recorded agent message. Illustratively, communication devices 101 and 201, message recorders 102 and 202, agent detection modules 103 and 204, codecs 104 and 204, contact centers 120 and 220, message processing agent 121 and 221, and administration terminal 130 are stored-program-controlled entities, such as a computer or processor, which performs the method of FIGS. 3-5 and the processes described herein by executing program instructions stored in a non-transient computer readable storage medium, such as a memory or disk.

The process starts in step 300. A recorded agent message is received in step 302. The recorded agent message is recorded by an agent of contact center 120. The recorded agent message is stored in step 304. This process can then be repeated to store additional agent messages.

As indicated by the dashed lines, steps 305-310 may be implemented using different techniques. For example, steps 305-310 may be implemented using a separate thread or steps 306-310 may be implemented serially.

In an embodiment, the agent message can be optionally sent 305 to a reviewing agent. The agent message can be reviewed by the agent's supervisor, a supervisor group, an automated content reviewing application, and the like. If the agent message contains inaccuracies, the agent can be notified to make the necessary changes.

The process determines in step 306 if an agent has been detected actively using communication device 101. If the agent has not been detected actively using communication device 101, the process repeats. If the agent has been detected actively using communication device 101 in step 306, the process checks in step 308 to see if communication device 101 already has the recorded agent message. If communication device 101 already has the recorded agent message in step 308, the process goes to step 306.

Otherwise, if communication device 101 does not have the recorded agent message in step 308, the recorded agent message is sent 310 to communication device 101. The process then goes to step 306.

Optionally, the process can include steps 312 and 314. Based on sending the recorded agent message in step 310, a thread can be created (or it could be implemented serially) that detects in step 312 if the agent is no longer actively using communication device 101. If the agent is still actively using communication device 101 in step 312, the process repeats. If the agent is no longer actively using communication device 101 in step 312, the process deletes 314 the recorded agent message and the process is complete.

Figure 4:
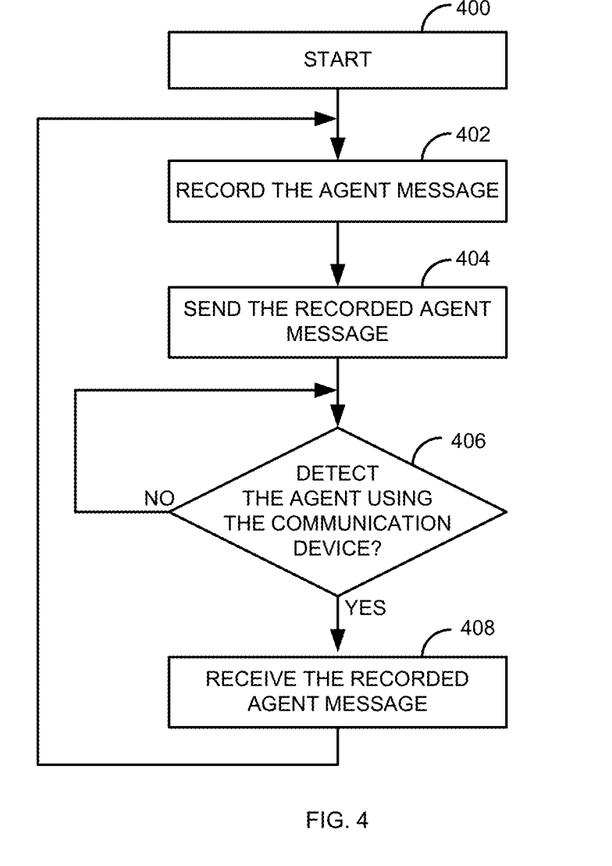
FIG. 4 is a flow diagram of a method for recording and preserving a recorded agent message.

FIG. 4 is a flow diagram of a method for recording and preserving a recorded agent message. FIG. 4 is shown from the perspective of communication device 101. However, specific steps in FIG. 4. (e.g., 402 and 404) can also be implemented in contact center 120. The process begins in step 400. The agent message is recorded in step 402. The recorded agent message is sent in step 404.

The process waits to detect if the agent is actively using communication device 101 in step 406. If the agent is not actively using communication device 101 in step 406, the process repeats. Otherwise, if the process detects that the agent is actively using communication device 101 in step 406, communication device 101 receives the recorded agent message. The process goes to step 402.

Figure 5:
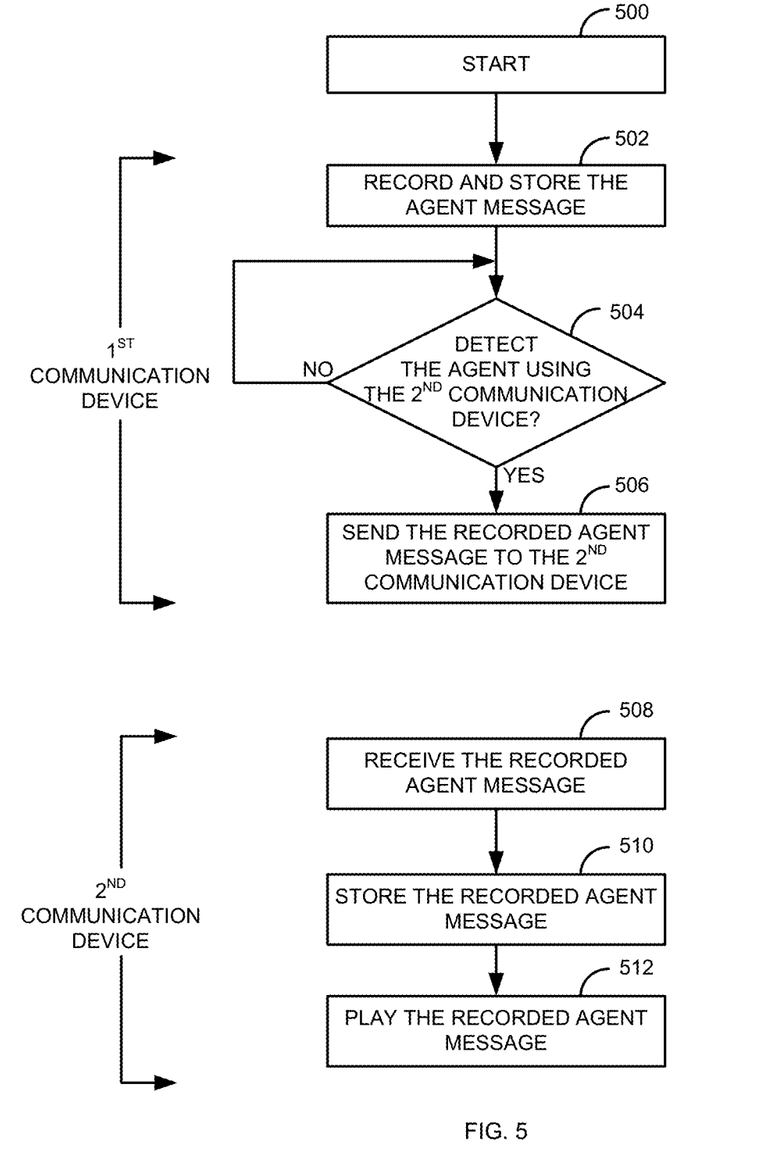
FIG. 5 is a flow diagram of a method for locally preserving a recorded agent message in a peer-to-peer environment.

FIG. 5 is a flow diagram of a method for locally preserving a recorded agent message in a peer-to-peer environment. The process starts in step 500. Communication device 201A records and stores the agent message. The agent message is recorded by an agent of contact center 120.

Communication device 201A waits to detect that the agent is actively using communication device 201B in step 504. Communication device 201A can detect that the agent is actively using communication device 201B in different ways. For example, communication device 201B can send a message to communication device 201A that the agent is actively using communication device 201B. Alternatively, communication device 201A may poll communication device 201B periodically. If communication device 201A has not detected that the agent is actively using communication device 201B in step 504, the process repeats. Otherwise, if communication device 201A has detected that the agent is actively using communication device 201B in step 504, communication device 201A sends 506 the recorded agent message to communication device 201B.

Communication device 201B receives 508 the recorded agent message. Communication device 201B stores 510 the recorded agent message. The agent can then play 512 the recorded agent message.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   receiving a recorded agent message, wherein the recorded agent message was recorded by an agent;
   storing the recorded agent message;
   detecting that the agent is actively using one of a first agent communication device or a second agent communication device;
   in response to detecting that the agent is actively using the one of the first or the second agent communication devices, sending the recorded agent message to the detected one of the first or second agent communication devices and saving the recorded message in the detected one of the first or second agent communication devices; and
   playing the saved recorded agent message to a customer when the customer is connected to the detected one of the first or second agent devices.

2. The method of claim 1, wherein the recorded agent message is received from the first agent communication device and the one of the first or the second agent communication devices is the first agent communication device.

3. The method of claim 1, wherein the recorded agent message is received from the first agent communication device and the one of the first or the second agent communication devices is the second agent communication device.

4. The method of claim 1, further comprising the step of sending the stored recorded agent message to a separate reviewing entity.

5. The method of claim 1 wherein detecting that the agent is actively using the one of the first or the second agent communication devices comprises detecting at least one of: a login, voice recognition, facial recognition, an RFID registration, a Bluetooth connection, a WiFi connection, a calendar event, and an email.

6. The method of claim 5, further comprising the steps of:
   detecting that the agent is no longer using the one of the first or second agent communication devices; and in response to detecting that the agent is no longer actively using the one of the first or the second agent communication devices, deleting the recorded agent message from a memory of the one of the first or the second agent communication devices.

7. The method of claim 6, wherein detecting that the agent is no longer actively using the one of the first or second agent communication device is based on one of: a logout, facial recognition, voice recognition, a defined time period of when the agent is working, a button push, an RFID event, a WiFi disconnection, a calendar event, and an email.

8. The method of claim 1, further comprising the step of recording the agent message on the first agent communication device or in a contact center.

9. A system comprising:
- a message processing agent configured to receive a recorded agent message and to send the recorded agent message to one of a first or a second agent communication device in response to detecting that an agent is actively using the one of the first or the second agent communication devices;
- a memory configured to store the recorded agent message, wherein the recorded agent message was recorded by the agent;
- an agent detection module, in response to detecting that the agent is actively using the one of the first agent or the second agent communication devices, is configured to send the recorded agent message to the detected one of the first agent or the second agent communication devices and save the recorded message on the detected one of the first agent or the second agent communication devices; and
- a message recorder configured to play the saved recorded agent message when a customer is connected to the detected one of the first agent or the second agent devices.

10. The system of claim 9, wherein the recorded agent message is received from the first agent communication device and the one of the first or the second agent communication devices is the first agent communication device.

11. The system of claim 9, wherein the recorded agent message is received from the first agent communication device and the one of the first or the second agent communication devices is the second agent communication device.

12. The system of claim 9, wherein the recorded agent message comprises at least one of a voice message, a video message, and a text message.

13. The system of claim 12, wherein the recorded agent message is a text message and the recorded agent message is sent based on an initiation of an Instant Message session.

14. The system of claim 12, wherein the recorded agent message is a text message and the text message is converted to audio.

15. The system of claim 9, wherein detecting that the agent is actively using the one of the first or the second agent communication devices comprises detecting at least one of: a login, voice recognition, facial recognition, an RFID registration, a Bluetooth connection, a WiFi connection, a calendar event, and an email.

16. The system of claim 9, wherein the agent detection module is further configured to detect that the agent is no longer actively using the one of the first or second agent communication devices and the one of the first or second agent communication devices is further configured to delete the recorded agent message from a memory of the one of the first or the second agent communication devices in response to detecting that the agent is no longer actively using the one of the first or the second agent communication devices.

17. A plurality of agent communication devices comprising:
- a first agent communication device configured to record an agent message and to send the recorded agent message to a second agent communication device in response to detecting that an agent is actively using the second agent communication device; and
- the second agent communication device configured to receive the recorded agent message upon detecting that the agent is actively using the second agent communication device, store the recorded agent message, and play the saved recorded agent message to a customer when the customer is connected to the second agent communication device.

18. The plurality of agent communication devices of claim 17, wherein the second agent communication device is further configured to detect that the agent is no longer actively using the second agent communication device and delete the recorded agent message from a memory of the second agent communication device in response to detecting that the agent is no longer actively using the second agent communication device.

19. The plurality of agent communication devices of claim 17, wherein detecting that the agent is actively using the second agent communication device comprises detecting at least one of: a login, voice recognition, facial recognition, an RFID registration, a Bluetooth connection, a WiFi connection, a calendar event, and an email.

* * * * *